United States Patent
Elstner et al.

[11] Patent Number: 5,837,631
[45] Date of Patent: Nov. 17, 1998

[54] MOLDED SILICON CARBIDE BODIES

[75] Inventors: Ingo Elstner, Wiesbaden; Daniel Grimm, Bad Schwalbach; Rudolf Hebel, Ginsheim; Klaus Santowski, Pleitersheim, all of Germany

[73] Assignee: Didier-Werke AG, Wiesbaden, Germany

[21] Appl. No.: 737,233
[22] PCT Filed: Apr. 24, 1996
[86] PCT No.: PCT/EP96/01704
§ 371 Date: Nov. 8, 1996
§ 102(e) Date: Nov. 8, 1996
[87] PCT Pub. No.: WO96/33959
PCT Pub. Date: Oct. 31, 1996

[30] Foreign Application Priority Data

Apr. 28, 1995 [DE] Germany .......... 195 15 627.7
Apr. 17, 1996 [DE] Germany .......... 195 14 968.1

[51] Int. Cl.⁶ .......... C04B 35/565
[52] U.S. Cl. .......... 501/90; 501/80; 501/82; 501/89; 501/92; 501/96.5
[58] Field of Search .......... 501/80, 82, 89, 501/90, 92, 96.5

[56] References Cited

U.S. PATENT DOCUMENTS

| | | | |
|---|---|---|---|
| 4,272,062 | 6/1981 | Fuziwara et al. | 266/284 |
| 5,135,893 | 8/1992 | Dohi et al. | 501/90 |
| 5,212,123 | 5/1993 | Schoennahl | 501/92 |
| 5,441,799 | 8/1995 | Owens et al. | 501/90 |

*Primary Examiner*—Karl Group
*Attorney, Agent, or Firm*—Wenderoth, Lind & Ponack, L.L.P.

[57] ABSTRACT

The invention relates to a microporous carbon-bound molded SiC body with granular SiC, secondarily formed SiC and a secondarily formed silicon compound, for use as inwall brick for lining a blast furnace as well as for use as susceptor for heating ceramic, electrically non-conductive molded bodies, inorganic melts, glasses and slags.

29 Claims, 2 Drawing Sheets

MOLDED SILICON CARBIDE BODIES

BACKGROUND OF THE INVENTION

The invention relates to a carbon-bound molded SiC body with granular SiC, secondarily formed SiC, and a process for the production of the molded SiC body.

Refractory molded SiC bodies with a bonding matrix comprising SiAlON are used in blast furnace shafts and are found to be suitable against corrosive and abrasive stress. (Gießereitechnik 1993 No. 5, page 163, left column, paragraph 4). But such molded bodies have an unsatisfactory resistance to thermal shock.

Furthermore, molded SiC bodies with a bonding phase comprising silicon nitride are not sufficiently resistant to temperature changes in the region of the lower shaft, belly or waist of the blast furnace. For use in blast furnaces, molded bodies on the basis of carbon have too low a resistance against abrasion.

According to DE-OS 22 32 719 for the shaft of blast furnaces are known molded SiC bodies with an SiC bond formed through the reaction of silicon with carbon during the burning. But these molded bodies are not sufficiently resistant against thermal shock and the attack of alkali compounds.

In EP 0 128 165 are disclosed mixtures of carbon-containing materials, refractory grains, such as silicon carbide, refractory oxides, silicon metal and coking carbon-containing bonding agents for the production of refractory bricks which are provided for lining blast furnaces (claim 1, 4, 9, 11). Through the burning, carried out at relatively low temperatures, molded bodies are obtained which have a bonding phase, generated from the carbon-containing bonding means, comprising carbon and silicon, to which in particular advantageous properties, such as low porosity, high strength, erosion resistance and oxidation resistance are traced back. But these molded bodies do not have sufficient resistance against abrasion and attack by alkalies and pig iron.

SUMMARY OF THE INVENTION

The task according to the invention is seen in a molded SiC body which has high mechanical strength and abrasion resistance, alkali resistance and pig iron resistance and oxidation resistance, i.e. a markedly lower furnace loss. The molded SiC body should further have improved resistance to thermal shock.

The solution of the task resides in a molded SiC body and a process for the production and the use of molded SiC body as described below.

That is, the present invention is directed to a molded SiC body comprising secondarily formed SiC, free carbon and an oxygen-containing silicon compound, and having an appropriate porosity and pore distribution.

DETAILED DESCRIPTION OF THE INVENTION

Figure 1:
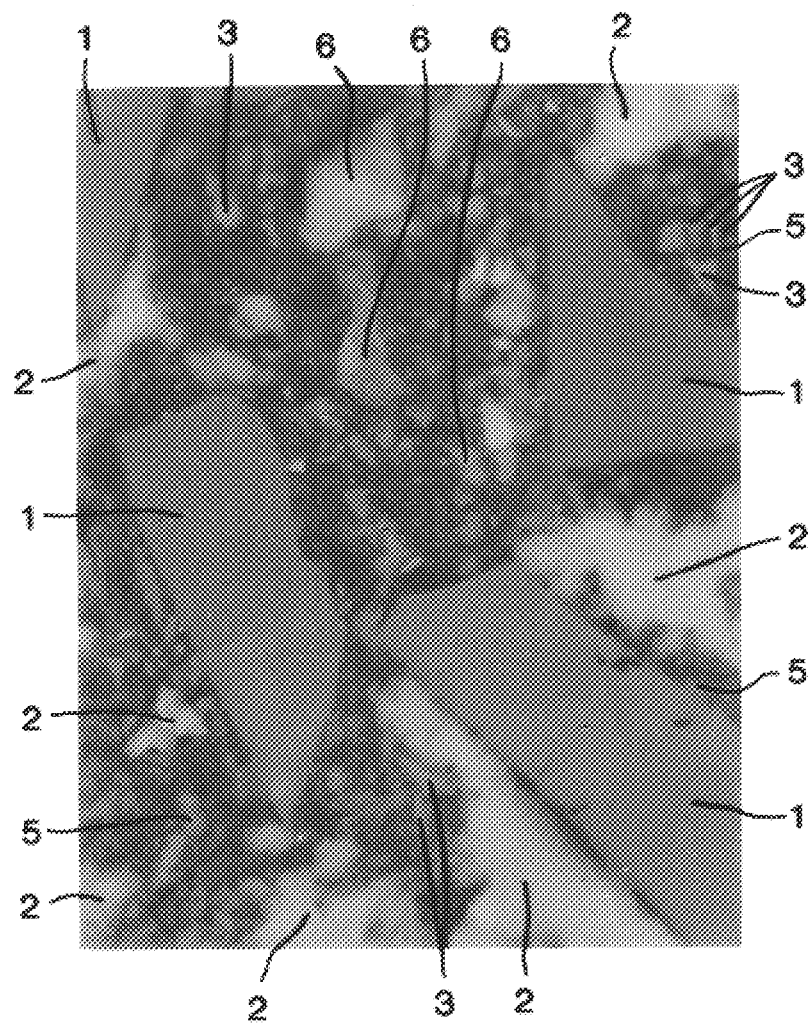
FIGS. 1 and 2 show the structure of molded SiC bodies of the present invention.
Figure 2:
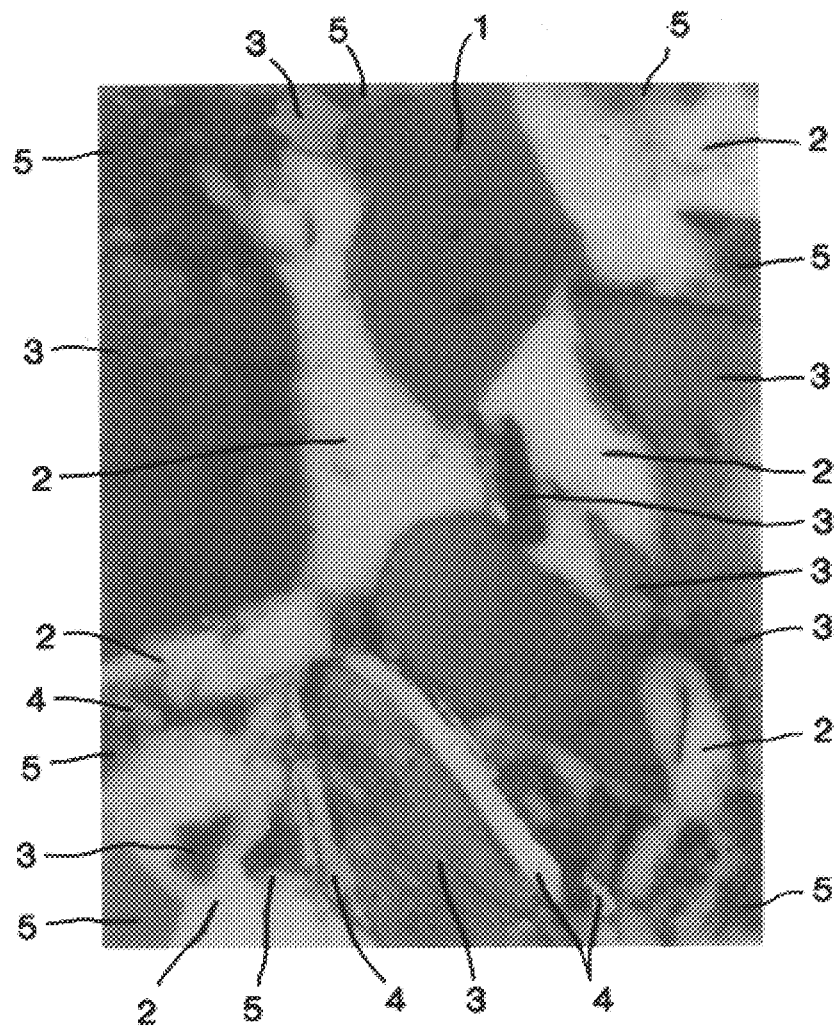

The molded SiC body of the present invention comprises secondarily formed SiC, 3–33 percent by weight free carbon, and 0.1–10 percent by weight of an oxygen-containing silicon compound, and has a porosity of 8–23 percent by volume, preferably 14–23 percent by volume, and a pore distribution with a fraction of the pores having a mean pore diameter greater than 1 μm, of less than 3 percent by volume.

Preferably, the molded SiC body contains 2–8 percent by weight of oxygen-containing silicon compound, and has a porosity of 17–20 percent by volume, and a pore distribution with a fraction of the pores having a mean pore diameter greater than 1 μm, of less than 2 percent by volume; or contains 0.1–5 percent by weight of oxygen-containing silicon compound, and has a porosity of 8–17 percent by volume, and a pore distribution with a fraction of the pores having a mean pore diameter of greater than 1 μm, of less than 3 percent by volume.

The oxygen-containing silicon compound preferably comprises $SiO_2$, and may further comprise silicon oxygenitride.

The invention also provides a process for the production of the molded SiC body, which process comprises providing a mixture comprising 40–80 percent by weight of SiC in a grain size of maximally 3 mm, preferably maximally 2.5 mm, 5–40 percent by weight of a carbon carrier, in a grain size of maximally 0.3 mm, 2–20 percent by weight, preferably 10–20 percent by weight, of metallic silicon in a grain size of maximally 0.075 mm and 5–10 percent by weight of an organic resin, pressing the mixture into a molded body, and burning the molded body in a muffle in an atmosphere, whose oxygen content is essentially based on CO and SiO, at 1200° C. to 1500° C.

The carbon carrier is preferably anthracite and/or graphite; and the organic resin is preferably phenol novolak resin.

The mixture preferably comprises 5–20 percent by weight, more preferably 7–15 percent by weight, of the carbon carrier; or preferably comprises 20–40 percent by weight, more preferably 30–35 percent by weight, of the carbon carrier.

The mixture may further comprise 2–10 percent by weight of fine-grained $Al_2O_3$ and/or 2–10 percent by weight $TiO_2$, based on the combined weight of granular SiC, carbon carrier and metallic silicon.

The mixture may further comprise 0.1–3 percent by weight of fine-grained boron carbide, based on the combined weight of granular SiC, carbon carrier, metallic silicon, and if present, $Al_2O_3$ and/or $TiO_2$.

Inwall bricks formed from the molded SiC body may be used to line a blast furnace. In addition, a susceptor for inductive heating of ceramic, electrically nonconductive molded body, inorganic melts, glasses and slags, may be formed from the molded SiC body.

Apart from high mechanical strength and abrasion resistance which can be traced back to the original granular SiC and the secondarily formed SiC, the molded SiC body according to the invention has a structure with a high component of fine pores (so-called microporosity). This structure is essentially determined by the carbon and by the secondarily formed SiC in combination with the secondarily formed silicon dioxide as well as potentially additionally formed oxynitride in the region of the fine-grained matrix. Within the scope of the composition of the molded SiC body from the individual components and the special structure is found a high alkali resistance, pig iron resistance, resistance to thermal shock and oxidation resistance. The oxidation resistance is enhanced through the silicon dioxide formed during the burning in the low-oxygen atmosphere and potentially formed silicon oxynitride. Due to the advantageous properties of abrasion resistance, pig iron resistance, alkali resistance and resistance to thermal shock, the molded SiC bodies are suitable for the lining of blast furnaces. At a higher content of carbon, the molded SiC body can be used as susceptor in the inductive heating of molded ceramic bodies.

The molded SiC body according to the invention, its production and properties will be explained in further detail through the examples:

The mixtures (Table 1) based on SiC in conventional grain distribution with a content of 98% SiC were molded at 90 MPa with the addition of phenol novolak resin and hexamethyltetramine to form molded bodies having the dimensions 64×124×375 mm$^3$.

To carry out the burning, the molded bodies are placed into a ceramic muffle in the presence of carbon dust and atmospheric air and burned at 1300° C. in an electric oven. At 1300° C., the burning atmosphere comprises essentially the oxygen compounds CO and SiO and can be called a low-oxygen atmosphere.

After the burning, molded bodies are obtained with a structure (see FIGS. 1+2 with reference symbols), which, apart from the coarse-grained SiC (1) comprise in the fine-grained matrix secondary SiC with SiO$_2$ (2) and free carbon (anthracite (3), graphite (4), cracked resin (5) as well as Al$_2$O$_3$ (6).

Regarding testing the properties of the molded bodies (Table 2), reference is made to the following: the free carbon and the total carbon are determined coulometrically. From the difference the SiC content is obtained by calculation.

As the measure of the resistance to thermal shock the thermal stress parameter $R_1$ is used.

$R_1$=flexural strength×(1−lateral deformation coefficient)/ (modulus V×thermal expansion)

wherein the value 0.1 is assumed for the lateral deformation coefficient (after W. Schulle: Feuerfeste Werkstoffe {Refractory Materials}, 1990, page 139).

Testing for alkali resistance is performed using prismatic specimen rods which are embedded in a SiC muffle in a bed of coke and alkali salt (ratio of coke to potassium carbonate= 4:1) and are kept at 1250° C. for 48 hours. After the experiment, the change of length, or respectively increase of length, is measured.

The resistance to slag and pig iron is investigated in a laboratory drum type furnace. The lining with the sample bricks is stressed by means of a weight mixture comprising blast furnace slag, pig iron and coke at a ratio of weight of 2:1:1 at temperatures in the range of 1500° C. As a measure of the resistance to wear, the remaining brick thickness in percent is used, based on the original brick thickness.

The molded SiC bodies of Examples 1 to 4 according to the invention, apart from good mechanical strength and resistance to thermal shock, exhibit in particular an advantageous behaviour to alkalies and slags as well as a pore distribution to a large extent with pores having a pore diameter of less than 1 μm.

Due to their structure and the increased fraction of free carbon, the molded SiC bodies according to Example 3 and 4 are especially suitable as susceptors for inductive heating. Their conducting capacity, expressed by the specific electrical resistance, is for Example 1: 2000 Ω mm$^2$/m Example 2: 700 Ω mm$^2$/m Example 3: 260 Ω mm$^2$/m Example 4: 240 Ω mm$^2$/m at 1000° C.

TABLE 1

| Mixture components in percent by weight | Example 1 | Example 2 | Example 3 | Example 4 |
|---|---|---|---|---|
| SiC 0–2.5 mm | 70 | 70 | 50 | 55 |
| Anthracite 0–0.25 mm | 10 | 5 | 20 | 20 |
| Graphite, flakes |  | 5 | 10 | 10 |
| Silicon < 0.075 | 15 | 15 | 15 | 15 |
| Al$_2$O$_3$ calc. > 3 pm | 5 |  |  | 5 |
| TiO$_2$ Anatase >> 1 μm |  | 5 |  |  |
| Phenolic resin | +5.5 | +6.0 | +7.0 | +6.0 |
| Hexamethyltetramine | +0.7 | +0.7 | +0.7 | +0.7 |

TABLE 2

| Properties |  | Example 1 | Example 2 | Example 3 | Example 4 |
|---|---|---|---|---|---|
| Bulk density | g/cm$^2$ | 2.45 | 2.51 | 2.15 | 2.11 |
| Porosity, open | Vol. % | 19.4 | 17.6 | 20.9 | 21.1 |
| Pores > 1 μm | Vol. % | 1.4 | 1.9 | 1.7 | 2.8 |
| Pore diameter d$_{50}$ | μm | 0.15 | 0.14 | 0.17 | 0.13 |
| Cold test pressure | MPa | 218 | 135 | 84 | 77 |
| Flexural strength | MPa | 37 | 34 | 18 | 17 |
| Modulus V | GPa | 41 | 32 | 15 | 11 |
| Thermal expansion 1500° C. | 10$^{-6}$/K | 4.1 |  |  | 4.3 |
| Resistance to thermal shock $R_1$ | K | 220 |  |  | 320 |
| Thermal conductivity Flushing with argon 1000° C. | W/mK | 10.5 |  |  |  |
| Abrasion resistance acc. to Böhme | cm$^3$/cm$^2$ | 0.013 |  |  |  |
| SiC | Weight % | 77 | 82 | 63 | 66 |
| C free | Weight % | 7.4 | 6.3 | 23.7 | 24.7 |
| Al$_2$O$_3$ | Weight % | 5.5 | 0.7 | 5.0 | 1.0 |
| SiO$_2$ | Weight % | 5.7 | 2.0 | 3.3 | 3.4 |
| TiO$_2$ | Weight % |  | 4.2 |  |  |
| Alkali resistance, linear | % |  | +0.25 |  |  |
| Slag resistance | % |  |  | 97 |  |

We claim:

1. A molded SiC body comprising secondarily formed SiC, 3–33 percent by weight free carbon, and 0.1–10 percent by weight of an oxygen-containing silicon compound, and having a porosity of 8–23 percent by volume, and a pore distribution with a fraction of the pores having a mean pore diameter greater than 1 μm, of less than 3 percent by volume.

2. A molded SiC body according to claim 1, wherein the porosity is 14–23 percent by volume.

3. A molded SiC body according to claim 1, with 2–8 percent by weight of oxygen-containing silicon compound, a porosity of 17–20 percent by volume, and a pore distribution with a fraction of the pores having a mean pore diameter greater than 1 μm, of less than 2 percent by volume.

4. A molded SiC body according to claim 1, with 0.1–5 percent by weight of oxygen-containing silicon compound, a porosity of 8–17 percent by volume, and a pore distribution with a fraction of the pores having a mean pore diameter of greater than 1 μm, of less than 3 percent by volume.

5. A molded SiC body according to one of claims 1–4, wherein the oxygen-containing silicon compound comprises SiO$_2$.

6. A molded SiC body according to claim 5, wherein the oxygen-containing compound further comprises silicon oxynitride.

7. A process for the production of a molded SiC body comprising secondarily formed SiC, 3–33 percent by weight free carbon, and 0.1–10 percent by weight of an oxygen-containing silicon compound, and having a porosity of 8–23 percent by volume, and a pore distribution with a fraction of the pores having a mean pore diameter greater than 1 µm, of less than 3 percent by volume, which process comprises providing a mixture comprising 40–80 percent by weight of SiC in a grain size of maximally 3 mm, 5–40 percent by weight of a carbon carrier, in a grain size of maximally 0.3 mm, 2–20 percent by weight of metallic silicon in a grain size of maximally 0.075 mm and 5–10 percent by weight of an organic resin, pressing the mixture into a molded body, and burning the molded body in a muffle in an atmosphere, whose oxygen content is essentially based on CO and SiO, at 1200° C. to 1500° C.

8. A process according to claim 7, wherein the grain size of the SiC is maximally 2.5 mm.

9. A process according to claim 7 wherein the carbon carrier is anthracite, graphite or a mixture thereof.

10. A process according to claim 7, wherein the mixture comprises 10–20 percent by weight of the metallic silicon.

11. A process according to claim 9, wherein the organic resin is phenol novolak resin.

12. A process according to claim 7, wherein the molded SiC body has 2–8 percent by weight of oxygen-containing silicon compound, a porosity of 17–20 percent by volume, and a pore distribution with a fraction of the pores having a mean pore diameter greater than 1 µm, of less than 2 percent by volume.

13. A process according to claim 7, wherein the molded SiC body has 0.1–5 percent by weight of oxygen-containing silicon compound, a porosity of 8–17 percent by volume, and a pore distribution with a fraction of the pores having a mean pore diameter of greater than 1 µm, of less than 3 percent by volume.

14. A process according to claim 7, wherein the oxygen-containing silicon compound comprises $SiO_2$.

15. A process according to claim 7, wherein the mixture comprises 5–20 percent by weight of the carbon carrier.

16. A process according to claim 15, wherein the mixture comprises 7–15 percent by weight of the carbon carrier.

17. A process according to claim 7, wherein the mixture comprises 20–40 percent by weight of the carbon carrier.

18. A process according to claim 17, wherein the mixture comprises 30–35 percent by weight of the carbon carrier.

19. A process according to one of claims 7, 15, or 17, wherein the mixture further comprises 2–10 percent by weight of fine-grained $Al_2O_3$ and/or 2–10 percent by weight $TiO_2$, based on the combined weight of granular SiC, carbon carrier and metallic silicon.

20. A process according to one of claims 7, 15 or 17, wherein the mixture further comprises 0.1–3 percent by weight of fine-grained boron carbide, based on the combined weight of granular SiC, carbon carrier and metallic silicon.

21. A process according to claim 19, wherein the mixture further comprises 0.1–3 percent by weight of fine-grained boron carbide, based on the combined weight of granular SiC, carbon carrier, metallic silicon, and $Al_2O_3$ and/or $TiO_2$.

22. A blast furnace lined with inwall bricks formed from a molded SiC body comprising secondarily formed SiC, 3–33 percent by weight free carbon, and 0.1–10 percent by weight of an oxygen-containing silicon compound, and having a porosity of 8–23 percent by volume, and a pore distribution with a fraction of the pores having a mean pore diameter greater than 1 µm, of less than 3 percent by volume.

23. A susceptor for inductive heating of ceramic, electrically nonconductive molded body, Inorganic melts, glasses and slags, formed from a molded SiC body comprising secondarily formed SiC, 3–33 percent by weight free carbon, and 0.1–10 percent by weight of an oxygen-containing silicon compound, and having a porosity of 8–23 percent by volume, and a pore distribution with a fraction of the pores having a mean pore diameter greater than 1 µm, of less than 3 percent by volume.

24. A blast furnace according to claim 22, wherein the porosity of the molded SiC body is 14–23 percent by volume.

25. A blast furnace according to claim 22, wherein the molded SiC body has 2–8 percent by weight of oxygen-containing silicon compound, a porosity of 17–20 percent by volume, and a pore distribution with a fraction of the pores having a mean pore diameter greater than 1 µm, of less than 2 percent by volume.

26. A blast furnace according to claim 22, wherein the molded SiC body has 0.1–5 percent by weight of oxygen-containing silicon compound, a porosity of 8–17 percent by volume, and a pore distribution with a fraction of the pores having a mean pore diameter of greater than 1 µm, of less than 3 percent by volume.

27. A susceptor according to claim 23, wherein the porosity of the molded SiC body is 14–23 percent by volume.

28. A susceptor according to claim 23, wherein the molded SiC body has 2–8 percent by weight of oxygen-containing silicon compound, a porosity of 17–20 percent by volume, and a pore distribution with a fraction of the pores having a mean pore diameter greater than 1 µm, of less than 2 percent by volume.

29. A susceptor according to claim 23, wherein the molded SiC body has 0.1–5 percent by weight of oxygen-containing silicon compound, a porosity of 8–17 percent by volume, and a pore distribution with a fraction of the pores having a mean pore diameter of greater than 1 µm, of less than 3 percent by volume.

* * * * *